(12) United States Patent
Granqvist

(10) Patent No.: US 8,970,938 B2
(45) Date of Patent: Mar. 3, 2015

(54) ELECTROCHROMIC DEVICE

(75) Inventor: Claes Göran Granqvist, Uppsala (SE)

(73) Assignee: Chromogenics AB, Uppsala (SE)

( * ) Notice: Subject to any disclaimer, the term of this patent is extended or adjusted under 35 U.S.C. 154(b) by 0 days.

(21) Appl. No.: 14/009,321

(22) PCT Filed: Mar. 26, 2012

(86) PCT No.: PCT/SE2012/050331
§ 371 (c)(1),
(2), (4) Date: Oct. 1, 2013

(87) PCT Pub. No.: WO2012/138281
PCT Pub. Date: Oct. 11, 2012

(65) Prior Publication Data
US 2014/0133007 A1 May 15, 2014

(30) Foreign Application Priority Data
Apr. 6, 2011 (SE) ........................ 1150303

(51) Int. Cl.
*G02F 1/153* (2006.01)
*G02F 1/15* (2006.01)

(52) U.S. Cl.
USPC ........... 359/275; 359/265; 359/270; 359/271; 359/274

(58) Field of Classification Search
USPC ................................ 359/267–280
See application file for complete search history.

(56) References Cited

U.S. PATENT DOCUMENTS

| | | | |
|---|---|---|---|
| 5,011,751 A | 4/1991 | Yoneyama et al. | |
| 7,619,803 B2 * | 11/2009 | Kokeguchi et al. | 359/265 |
| 7,830,584 B2 * | 11/2010 | Shibuya et al. | 359/265 |
| 8,693,079 B2 * | 4/2014 | Agrawal et al. | 359/267 |
| 2011/0043886 A1 | 2/2011 | Joen et al. | |

FOREIGN PATENT DOCUMENTS

| | | |
|---|---|---|
| EP | 1715493 A1 | 10/2006 |
| JP | 2010-100512 A | 6/2010 |

OTHER PUBLICATIONS

Adebahr et al, Enhancement of ion dynamics in PMMA-based gels with addition of TiO2 nono-particles, Electrochemica Acta, 48(14-16):2099-2103 (Jul. 2003).
Schelm et al, Applied Physics Letters, 82(24):4346-4348 (Jun. 2003).
Schelm et al, Applied Physics Letters, 82(24):4346-4348 (Sep. 2003).
Extended European Search Report dated Sep. 1, 2014, from corresponding EP 12767657.5-1904.

* cited by examiner

Primary Examiner — Mohammed Hasan
(74) Attorney, Agent, or Firm — Porter Wright Morris & Arthur LLP

(57) ABSTRACT

An electrochromic device (1) comprises a layered structure (11) having an ion conducting electrolyte layer (20). The ion conducting electrolyte layer (20) in turn comprises particles (30) absorbing electromagnetic radiation. The particles (30) are electrically conducting. The particles have a main light absorption above 700 nm.

20 Claims, 1 Drawing Sheet

ELECTROCHROMIC DEVICE

TECHNICAL FIELD

The present invention relates in general to electrochromic devices.

BACKGROUND

Electrochromic materials have the property of changing their colour depending on the charging state. Electrochromic devices have been developed for a number of different applications, ranging from e.g. eyewear to displays. One typical application is in so-called smart windows. By changing a voltage applied across a film provided at a window glass, the window can be made dark and thereby it significantly reduces the amount of transmitted light. This is of particular interest where the amount of solar radiation is large and one wants to reduce the amount of light and/or heat being transmitted into the room inside the window. A fast transition between dark and light appearance is often required, enabling control of the colour state of the window depending e.g. on whether a person is present in the room or not. Also as complete a transition as possible, i.e. from very transparent to almost black, is requested.

Even if the control of the transmission of the visible light is satisfactory with electrochromic devices of today, heat transfer through the windows may still cause problems. In a majority of cases where windows provided with electrochromic devices are used, the need for achieving heat from the light through the window is generally low. On the contrary, in most cases the heat transfer through prior art smart windows is too large. When the window is transparent, it is not always requested or even wanted to have the infra red radiation transmitted into the room. Thus, there are still problems with too high heat transfer through prior art electrochromic devices in different applications.

RELATED ART

In the published European patent application EP 1 715 493 A1, an ion conductor and electrochemical display device are disclosed. The ion conductor comprises fine particles of an organic polymer including 20 to 80% by mass of ultrafine particles of an inorganic compound, and an electrolytic solution impregnated into the fine particles of the organic polymer have a specified surface area measured by the BET method of 30 $m^2/g$ or more.

In the U.S. Pat. No. 5,011,751, an electrochemical device is disclosed. The electrochemical device comprises a pair of electrodes and a solid or solid-like composite electrolyte interposed therebetween, comprising substantially uniform spherical particles having no or substantially no electronic conductivity which are dispersed in the solid or solid-like composite electrolyte.

SUMMARY

A main object of the present invention is to reduce the transmittance of heat through an electrochromic device. An auxiliary object of the present invention is to increase the transfer speed between coloured and bleached states of an electrochromic device.

The above objects are achieved by devices according to the enclosed independent claim. Preferred embodiments are defined by the dependent claims. In general words, an electrochromic device comprises a layered structure having an ion conducting electrolyte layer. The ion conducting electrolyte layer in turn comprises particles absorbing electromagnetic radiation. The particles are electrically conducting. The particles have a main light absorption above 700 nm.

One advantage with the present invention is that electrochromic devices are provided, which restrict the transmittance of heat while keeping the requested performance regarding visible light.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

One general approach to reduce the heat transfer through an electrochromic device is to provide the device with a film of an IR absorbing or reflecting material. Besides finding the right material, such an additional film increases the general complexity of the device and requires typically an additional manufacturing step.

A basic idea of the present invention is instead to utilize the electrolyte layer of an electrochromic device having a layered structure. Particles of conducting materials have the property of absorbing light. When light is impinging, plasma resonance in the particles is excited, which absorbs the energy of certain wavelengths of the light. Depending on e.g. the conductivity, the size and shape of the particle, the peak of this absorption can be moved in wavelength.

Figure 1:
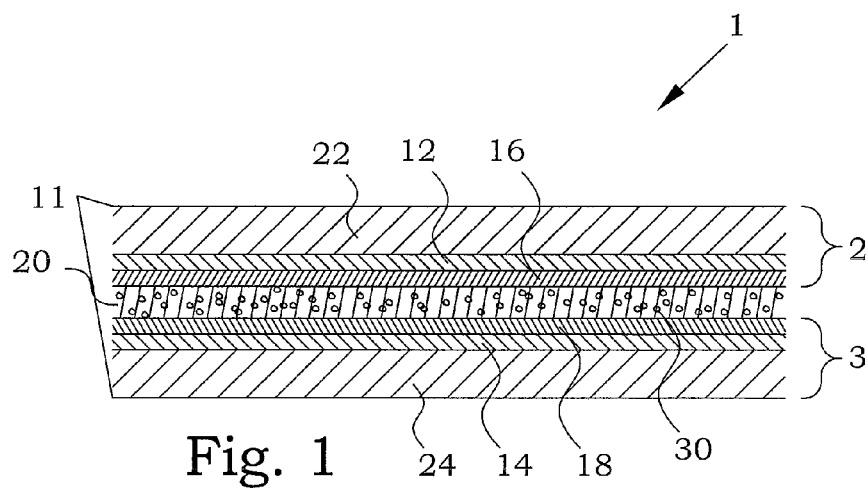
FIG. 1 is a schematic illustration of an embodiment of an electrochromic device.

FIG. 1 illustrates an embodiment of an electrochromic device 1. The present electrochromic device 1, which is of a non-self-erasing type, comprises a layered structure 11. The layered structure 11 comprises an ion conducting electrolyte layer 20 laminated between a first half cell 2 and a second half cell 3. The ion conducting electrolyte layer 20 is thereby on one side in contact with an electrochromic layer 16, capable of conducting electrons as well as ions. On the other side of the ion conducting electrolyte layer 20 is a counter electrode layer 18. The counter electrode layer 18 is capable of conducting electron and ions, and serves as an ion storage layer. This counter electrode film 18 may entirely or partly be constituted by a second electrochromic film. The central three-layer structure 16, 18, 20 is positioned between a first electron conducting layer 12 and a second electron conducting layer 14, in contact with the electrochromic layer 16 and the counter electrode layer 18, respectively. The first electron conducting layer 12 and the second electron conducting layer 14 are arranged against a first substrate 22 and a second 24 substrate, respectively. The first half cell 2 thus comprises the first electron conducting layer 12 and the electrochromic layer 16 and the second half cell 3 comprising the second electron conducting layer 14 and the counter electrode layer 18.

Note that the relative thicknesses of the layers in the different figures in the present disclosure do not represent the true relationship in dimensions. Typically, the substrates are much thicker than the other layers. The figures are drawn only for the purpose to illustrate connection principles, not to give any dimensional information.

Such an electrochromic device 1 is coloured/bleached by applying an external voltage pulse between the first electron conducting layer 12 and the second electron conducting layer 14 on the two sides of the layered structure 11, causing the electrons and ions to move between the electrochromic layer 16 and the counter electrode layer 18. The electrochromic layer 16 will thereby change its colour. Non-exclusive examples of electrochromic layers 16 are cathodically colouring thin films of oxides based on tungsten, molybdenum, niobium, titanium, lead and/or bismuth, or anodically colouring thin films of oxides, hydroxides and/or oxy-hydrides based on nickel, iridium, iron, chromium, cobalt and/or rhodium.

At least one of the first substrate 22 and the second substrate 24 has to be transparent, in order to reveal the electrochromic properties of the electrochromic layer 16 to the surroundings. In a typical case today, plastic substrates are used. In the most general sense, a plastic substrate is a synthetic or semisynthetic polymerization product. The plastic substrate is commonly classified by its polymer backbone. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyamides, polysulfides, polyvinylacetates and cellulose-based polymers Also at least one of the first electron conducting layer 12 and the second electron conducting layer 14 must be transparent. Non-exclusive examples of electron conductors transparent to visible light are thin films of Indium Tin oxide (ITO), Tin oxide, Zinc oxide, n- or p-doped Zinc oxide and Zinc oxyfluoride. Metal-based layers, such as ZnS/Ag/ZnS and carbon nanotube and graphene layers have been recently explored as well. Depending on the particular application, one or both of the first electron conductor layer 12 and the second electron conducting layer 14 may be made of a metal grid or wire mesh.

As mentioned above, a counter electrode layer 18 may comprise electrochromic materials as well as non-electrochromic materials. Non-exclusive examples of counter electrode layers 18 are cathodically colouring electrochromic thin films of oxides based on tungsten, molybdenum, niobium, titanium, lead and/or bismuth, anodically colouring electrochromic thin films of oxides, hydroxides and/or oxy-hydrides based on nickel, iridium, iron, chromium, cobalt and/or rhodium, or non-electrochromic thin films e.g. of oxides based on cerium as well as activated carbon. Oxides of vanadium are also electrochromic, but are not easily classified as anodically or cathodically colouring. Also combinations of such materials can be used as a counter electrode layer 18.

The ion conducting electrolyte layer 20 comprises an ion conductor material. The ion conducting electrolyte layer 20 may be transparent or non-transparent, coloured or non-coloured, depending on the application. Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of $TiO_2$, silica or other oxides. Some non-exclusive examples of lithium salts used are LiTFSI [lithium bis(trifluoromethane)sulfonimide], LiBF4 [lithium tetrafluoroborate], LiAsF6 [lithium hexafluoro arsenate], LiCF3SO3 [lithium trifluoromethane sulfonate], and LiClO4 [lithium perchlorate].

The ion conducting electrolyte layer 20 comprises particles 30. These particles 30 are electrically conducting. The particles 30 are adapted to absorb electromagnetic radiation. Different embodiments of such particles are described further below.

In the document EP 1 715 493 A1 referred to earlier, fine particles were used in the electrolyte, but for completely different reasons. Moreover, the stated compositions are non-conducting since e.g. tin oxide without any doping is an insulator. Also in the document U.S. Pat. No. 5,011,751, the introduced particles were used for other purposes, and therefore the particles were stated to preferably be without electric conductivity. It is therefore not obvious for anyone skilled in the art to modify the teachings according to these documents into a device according to the present invention.

Besides the optical properties, mentioned here above, such particles have also been found to increase the ion conductivity of the electrolyte. The particles themselves do of course not conduct any ions, but it has been found that ions are conducted more efficiently in the interface region between a solid material and the ion conducting electrolyte. By mixing solid particles into the ion conducting electrolyte layer 20, the overall ion conductivity can be increased. The electrochromic device can thereby be switched between coloured and uncoloured states at a faster rate. By utilizing the optically active particles described above, a synergetic effect is thus achieved between controlled light absorption and increased ion conductivity.

The advantage of using particles in the ion conducting electrolyte layer is not restricted to only the particular type of electrochromic device described in connection with FIG. 1. Since the effect on the properties is generally applicable, the present ideas can be applied to all electrochromic devices that have a layered structure in which an ion conducting electrolyte layer is comprised.

The particles in the ion conducting electrolyte layer may have different impact on the operation and appearance of the electrochromic device. In order to fit into the ion conducting electrolyte layer, the size of the particles has to be smaller than the width of the ion conducting electrolyte layer. Conducting particles in the same size as the layer width will jeopardize the electrical field applied across the ion conducting electrolyte layer. Also if a too large amount of particles are included, there is a risk for establishing a continuous electric conducting path through the ion conducting electrolyte layer. Such considerations are typically not very relevant, since there are typically other limitations.

A particle causes scattering of light. Scattering of light in the ion conducting electrolyte layer will be experienced as its becoming diffuse. Such an effect can be utilized in certain applications, e.g. where a window is requested to transmit some light but prohibit a clear sight, i.e. in similar applications as of "frosted" windows.

However, in most applications, a clear sight through the electrochromic device is requested and the scattering has to be limited to wavelengths that are undetectable for the human eye. Since particles do not scatter light of wavelengths much longer than the size of the particles, it is in such applications preferable to use particles below 400 nm. Even more preferable, particles with sizes below 100 nm are used.

The light absorption properties of small particles depend on a number of parameters. In most cases, it is requested that the electrochromic device should be as colourless as possible in its bleached state, which means that also the ion conducting electrolyte layer should be colourless. In such cases, it is therefore preferable to tune the light absorption of the particles to wavelengths outside the visible range or at least outside the parts of the visible spectrum wherein the eye is most sensitive. Therefore, it is preferred that the particles have a main light absorption of light with wavelengths above 700 nm. Even more preferably, the particles have a main light absorption of light with wavelengths above 750 nm.

However, in certain applications, tuning of the colour in the bleached state could be requested. In such applications, at least a part of the light absorption of the particles could be tuned to take place also in the visible wavelength range.

The absorption of light in particles is dependent on a number of factors. One important factor is the conductivity. Highly conductive materials have a large part of their light absorption in the visible range. However, as the conductivity is reduced, the general trend is that the absorption peak is displaced to longer wavelengths. If the conductivity is low enough, the absorption will only take place in the near infrared region or in the infrared region, and will leave the visible region more or less unaffected. However, note that in order to be able to absorb any IR radiation, the particles have to be conducting.

There are some interesting possibilities for selecting appropriate materials for the particles. Transparent conducting oxides are possible choices. Such transparent conducting oxides are already used in other respects of many electrochromic devices and are therefore believed to be easily integrated in a commercial production. Examples of transparent conducting oxides are e.g. doped tin oxides, doped zinc oxides, doped indium oxides, doped tungsten oxides and doped titanium oxides. The level of doping can easily be controlled to achieve different conductivities in the oxides. Also the degree of crystallinity will influence the absorption.

The doping is performed according to any prior art knowledge. Since it is the conductivity, and not the chemical properties, that is requested, the chemical nature of the doping elements is essentially unimportant, as long as a conductivity is provided. The doping can therefore basically be performed according to any prior art processes and the doping elements can basically be selected according to any prior art principles.

Another choice of materials for the particles is thermochromic materials. Thermochromic materials have the property of changing their transparency if the temperature increases above a certain transition temperature. Besides their absorbing properties in the infrared wavelength region, they may also show absorption in the visible range if the transition temperature is exceeded. It can therefore in certain applications be advantageous to use particles comprising thermochromic material, mixed into the ion conducting electrolyte layer. Examples of such thermochromic materials can be found e.g. among metal oxides or metal sulphides. Also organic thermochromic materials exist. The most common example of a thermochromic material is vanadium dioxide, in pure form or doped with one or several dopants, according to known procedures.

Also other materials are possible to be included in the particles. One example is e.g. particles comprising $LaB_6$.

The wavelength region for absorption may not only be dependent on the material itself. Also other factors such as the shape of the particles can influence the absorption. Since the absorption depends on excitations of plasmons in the particles, i.e. excitation of a collective motion of conduction electrons, the geometry may have influences. Therefore, highly elongated particles may present different absorption properties compared to e.g. particles with a more compact shape.

Figure 2A:
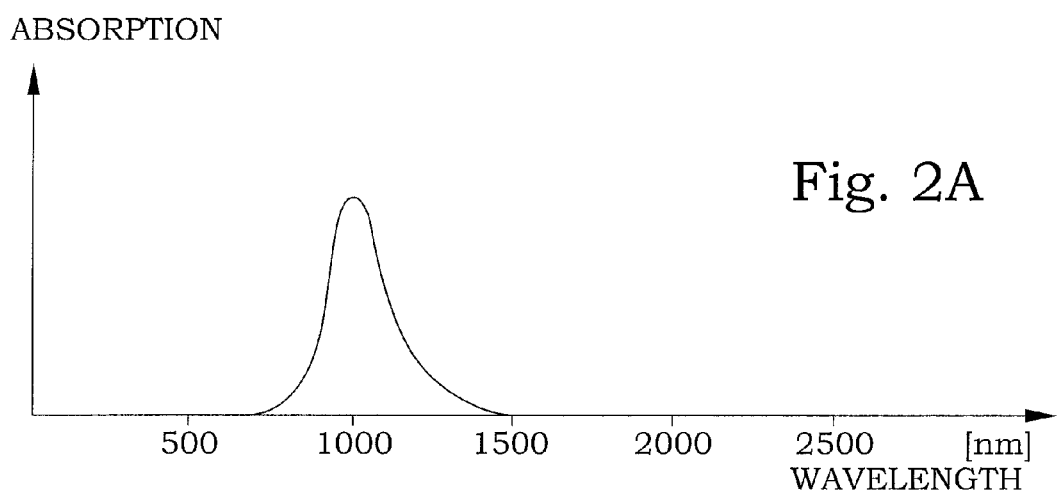
FIGS. 2A and 2B are diagrams showing absorption in the IR range of particles.
Figure 2B:
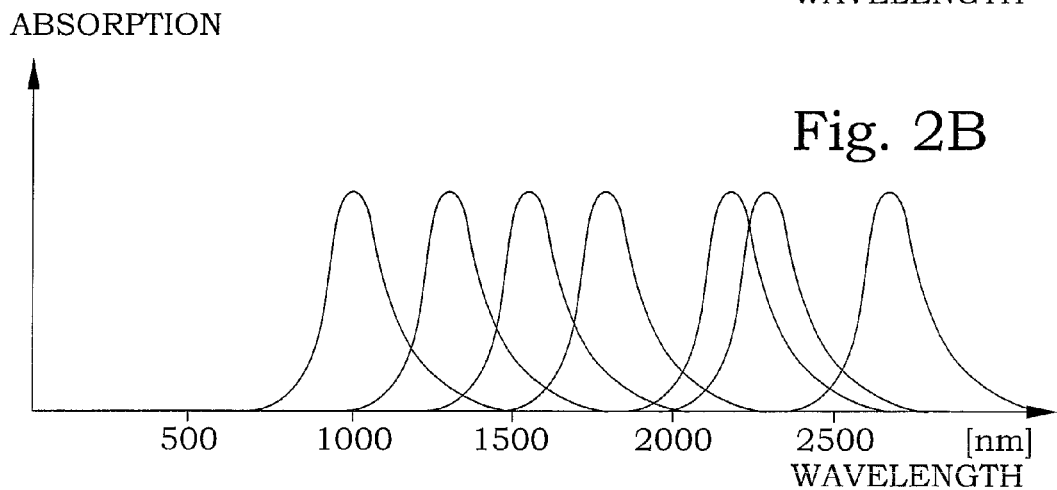

A single type of particle has a certain absorption range. FIG. 2A illustrates such a single particle type absorption. However, that range may be limited in wavelength. This means that even if the main absorption peak occurs in the IR range, there might a lot of IR radiation wavelengths that are almost unaffected. It is therefore preferred if the particles that are provided in the ion conducting electrolyte layer are of different types, having shifted but overlapping absorption ranges. Such a situation is illustrated in FIG. 2B. Here, several types of particles are mixed, which gives absorption over a wider wavelength range. The illustrated example is just an explanatory illustration. In practice, the shape, position and amplitude of the individual absorption spectra can be varied in many different configurations. Preferably, they together cover a wide wavelength range. This mix can e.g. be achieved by an electrolyte layer comprising particles with different conductivity. Another alternative is to have an electrolyte layer comprising particles with different particle shapes. Particles having both different conductivity and shapes can of course also be used.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An electrochromic device, comprising:
   a layered structure having an ion conducting electrolyte layer;
   wherein
   said ion conducting electrolyte layer comprises a liquid electrolyte and discrete particles absorbing electromagnetic radiation,
   said particles are electrically conducting;
   said particles have a main light absorption above 700 nm; and
   said particles have a size below 400 nm.

2. The electrochromic device according to claim 1, wherein said particles have a size below 100 nm.

3. The electrochromic device according to 2, wherein said particles have a main light absorption above 750 nm.

4. The electrochromic device according to claim 3, wherein said particles comprise transparent conducting oxides.

5. The electrochromic device according to claim 2, wherein said particles comprise transparent conducting oxides.

6. The electrochromic device according to claim 2, wherein said particles comprise thermochromic material.

7. The electrochromic device according to claim 1, wherein said particles have a main light absorption above 750 nm.

8. The electrochromic device according to 7, wherein said particles comprise transparent conducting oxides.

9. The electrochromic device according to claim 7, wherein said particles comprise thermochromic material.

10. The electrochromic device according to claim 1, wherein said particles comprise transparent conducting oxides.

11. The electrochromic device according to claim 10, wherein said particles comprise at least one of:
    doped tin oxides;
    doped zinc oxides;

doped indium oxides;
doped tungsten oxides; and
doped titanium oxides.

12. The electrochromic device according to claim 10, wherein said particles comprise thermochromic material.

13. The electrochromic device according to claim 1, wherein said particles comprise thermochromic material.

14. The electrochromic device according to claim 13, wherein said thermochromic material comprises at least one of:
a metal oxide;
a metal sulphide; and
an organic thermochromic material.

15. The electrochromic device according to claim 14, wherein said thermochromic material comprises at least one of:
vanadium dioxide; and
doped vanadium dioxide.

16. The electrochromic device according to claim 1, wherein said particles comprise $LaB_6$.

17. The electrochromic device according to claim 1, wherein said ion conducting electrolyte layer comprises particles with different conductivity.

18. The electrochromic device according to claim 1, wherein said ion conducting electrolyte layer comprises particles with different particle shapes.

19. An electrochromic device, comprising:
a layered structure,
wherein said layered structure comprises an ion conducting electrolyte layer laminated between a first half cell and a second half cell, said first half cell comprising a first electron conducting layer in contact with an electrochromic layer, said second half cell comprising a second electron conducting layer in contact with a counter electrode layer, said electrochromic layer and said counter electrode layer being in contact with said ion conducting electrolyte layer, and
wherein said ion conducting electrolyte layer comprises a liquid electrolyte and discrete particles absorbing electromagnetic radiation, and said particles are electrically conducting, have a main light absorption above 700 nm, and have a size below 400 nm.

20. The electrochromic device according to claim 19 wherein said layered structure further comprises a first substrate and a second substrate provided in contact with said first electron conducting layer and said second electron conducting layer, respectively.

\* \* \* \* \*